United States Patent [19]

DeVara et al.

[11] Patent Number: 4,931,710
[45] Date of Patent: Jun. 5, 1990

[54] SERVOACTUATOR WITH FEEDBACK AND METHOD OF CALIBRATING

[75] Inventors: Dennis DeVara, Carol Stream; Andrew A. Kenny, Roselle, both of Ill.

[73] Assignee: Eaton Corporation, Cleveland, Ohio

[21] Appl. No.: 177,729

[22] Filed: Apr. 5, 1988

[51] Int. Cl.$^5$ ............................................. G05B 1/06
[52] U.S. Cl. .................................. 318/663; 318/15; 338/184; 338/199
[58] Field of Search ................................ 318/663–688, 318/628, 560, 561, 563, 670–671, 9, 11–12, 15; 338/164, 184, 199; 74/DIG. 10, 412–416

[56] References Cited

U.S. PATENT DOCUMENTS

| | | | |
|---|---|---|---|
| 4,078,198 | 3/1978 | Murakosi et al. | 318/663 |
| 4,228,386 | 10/1980 | Griffith | 318/628 |
| 4,345,195 | 8/1982 | Griffith et al. | 318/628 |
| 4,426,607 | 1/1984 | Black et al. | 318/628 |
| 4,616,164 | 7/1985 | Kenny et al. | 318/666 |
| 4,656,407 | 4/1987 | Burney | 318/626 |

Primary Examiner—William M. Shoop, Jr.
Assistant Examiner—David Martin
Attorney, Agent, or Firm—R. A. Johnston

[57] ABSTRACT

A low voltage direct current motorized servoactuator having an output gear position feedback potentiometer with a ring gear received initially loosely on the potentiometer shaft and in engagement with the output gear. A collar keyed hinged to the potentiometer shaft, but axially movable thereon, permits the output gear to be positioned independently of the potentiometer for calibration without disengaging the ring gear. With the output gear in the desired position, the potentiometer shaft is rotated until the potentiometer reads the desired percentage of its full scale resistance or voltage output; and, the collar is then moved axially to a press fit with the ring gear to lock the calibration and thereafter to rotate the potentiometer shaft with rotation of the ring gear. The motor drive pinion is a worm formed of material having a minor fraction (18%) of chloro-fluorinated polymer and a lesser fraction (2%) of lubricant, balance polyimide plastic material. The driven gears are formed of material having a minor fraction (18%) of chloro-fluorinated polymer and a lesser fraction (2%) of lubricant, balance acetal plastic material.

20 Claims, 3 Drawing Sheets

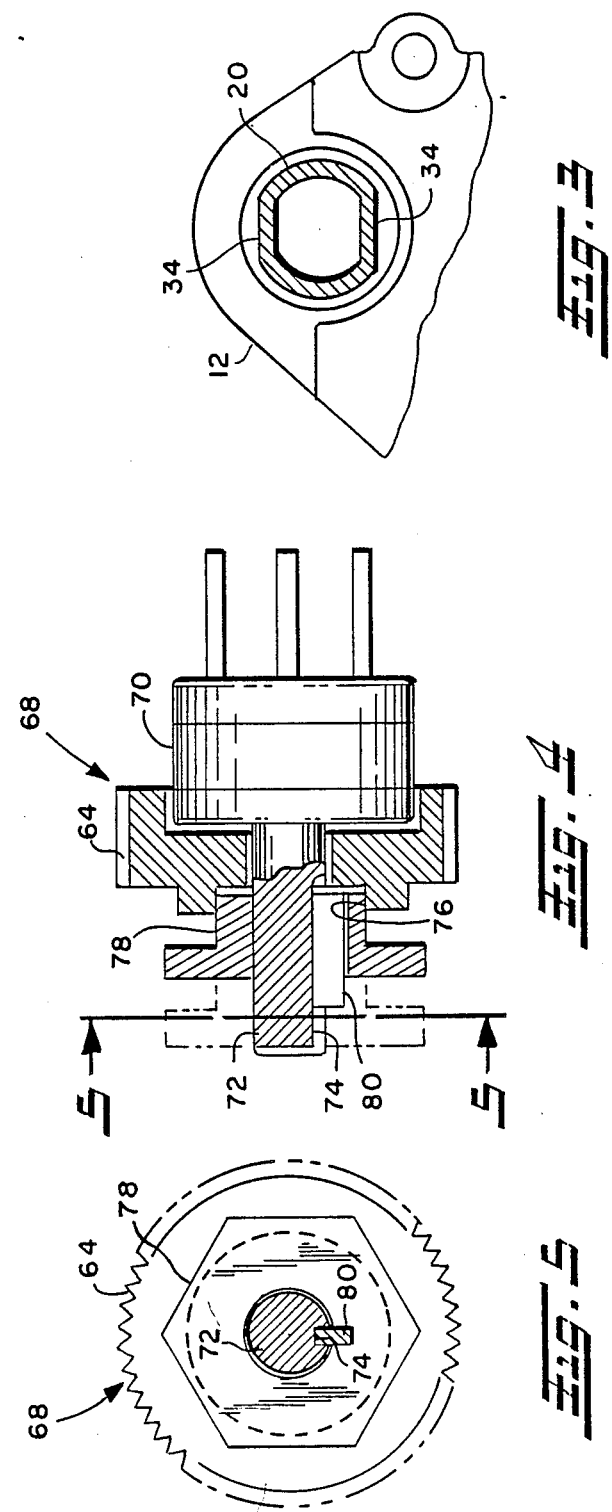

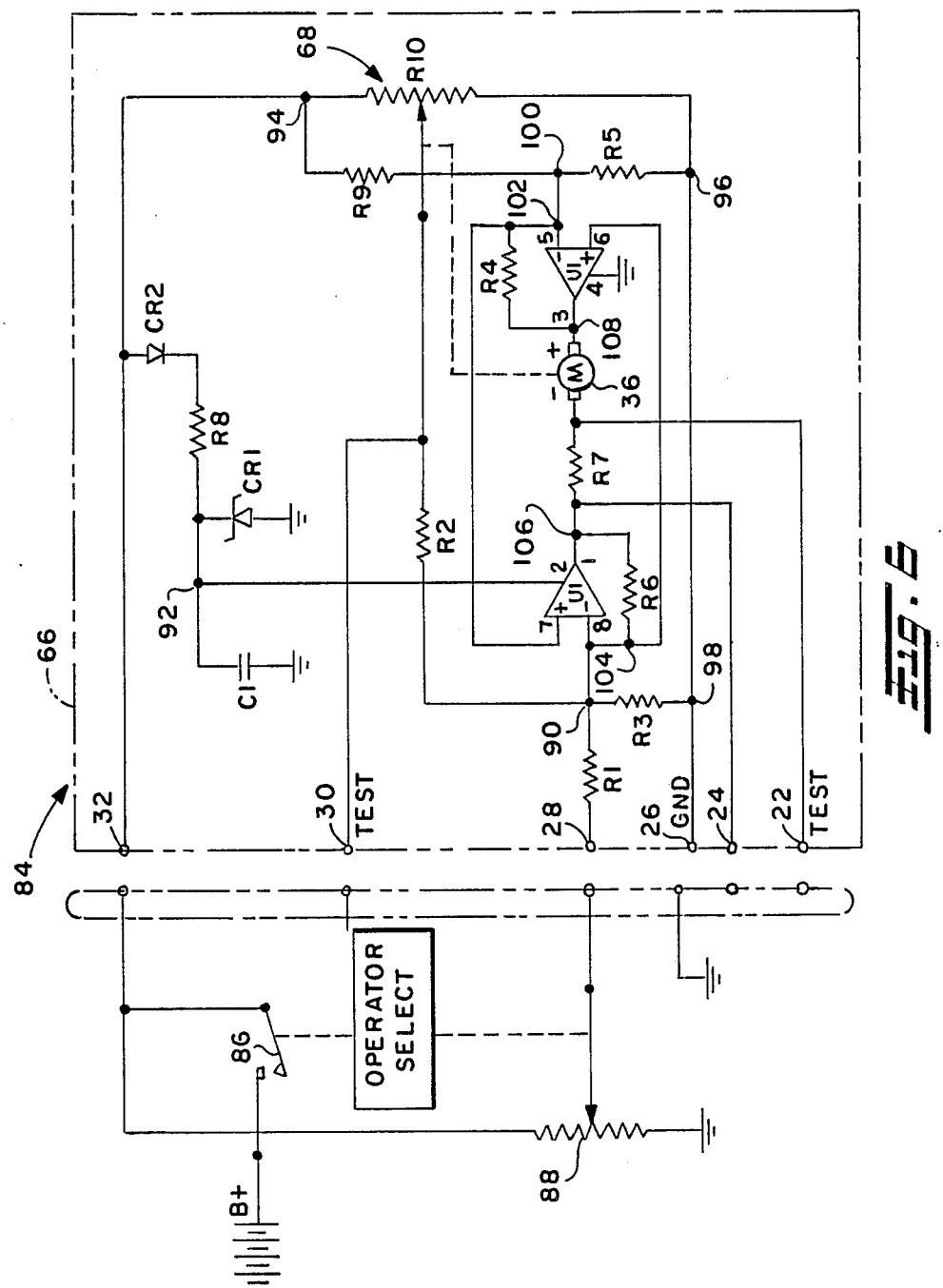

SERVOACTUATOR WITH FEEDBACK AND METHOD OF CALIBRATING

BACKGROUND OF THE INVENTION

The present inventions relates to motor driven servoactuators of the type operated by a low voltage direct current motor and employing a speed reducer to provide high torque slow rate of rotation output. Servoactuators of this type are known to employ a feedback potentiometer coupled to rotate with the output member for providing a variable resistance signal proportional to the rotational position of the output member. An example of such a device is a servoactuator employed for automative passenger compartment temperature control systems, one such device being shown and described in U.S. Pat. No. 4,616,164. The servoactuator in the aforesaid '164 patent employs a variable resistance strip on a portion of the housing with an electrical wiper contact rotated thereagainst by the output member for providing an electrical resistance signal proportional to the rotational position of the output member.

In providing electric servoactuators having a slow rate of rotation output and high torque output for automotive applications, it has been found necessary to employ a low current high RPM drive motor to accommodate the on-board vehicle low voltage power supply, typically 12 volts, and to provide a numerically high-ratio speed reduction in order to provide the desired output torque and position resolution. In order to achieve a numerically high-ratio speed reduction, several stages of gearing have been required to accomodate the high motor shaft RPM at the input stage of the speed reducer; and, this combination has resulted in prohibitive levels of vibration and noise transmitted to the vehicle passenger compartment through the servoactuator and motor housing.

Furthermore, in order to calibrate the output member position sensing feedback potentiometer, it has been required to position the output member at a specified position and then assemble the potentiometer to the speed reducer gearing in order to insure that the potentiometer is properly calibrated for the output member position with respect to the full scale output of the potentiometer. This has resulted in complicated and costly manufacturing procedures and difficulties in calibrating the servoactuator in high volume production operations.

Therefore, it has been desired to provide a low cost and compact low voltage d.c. motor-operated servoactuator having a numerically high-ratio speed reduction between the motor and the output member and to provide such a servoactuator that is easily manufactured, assembled and calibrated in high volume production and with minimum manufacturing cost.

SUMMARY OF THE INVENTION

The present invention provides a solution to the problem of designing a low cost easily assembled and calibrated servoactuator operated by a low voltage direct current motor and providing a numerically high speed reduction between the motor input and the rotational output member of the servoactuator. The servoactuator of the present invention employs a worm drive from the motor through four stages of gear reduction and has a potentiometer geared to the output member for providing an output position indication in the form of a variable resistance signal which nulls the motor when the output position signal matches a command input signal.

The potentiometer of the present invention has an annular collar keyed to the potentiometer shaft and axially movable thereon. A floating potentiometer drive gear is engaged with the speed reducer output member gear and the potentiometer shaft is positioned to provide the desired electrical resistance signal corresponding to the position of the output member. The annular collar is then moved axially on the keyway to a press fit engagement with the inner periphery of the potentiometer drive gear to thereby engage the drive gear with the potentiometer shaft for providing a feedback signal. The servoactuator of the present invention employs a unique and novel combination of fluorinated and/or chlorinated plastic polyimide and acetal gears with a small amount of lubricant compounded therein in the speed reducer for minimizing gear train noise.

BRIEF DESCRIPTION OF THE DRAWINGS

FIG. 3 is a section view taken along section indicating lines 3—3 of FIG. 2;

FIG. 4 is a section view taken along section indicating lines 4—4 of FIG. 1;

FIG. 5 is a section view taken along section indicating lines 5—5 of FIG. 4; and, FIG. 6 is a schematic of the electrical circuit for the servoactuator of FIG. 1.

DETAILED DESCRIPTION

Figure 1:
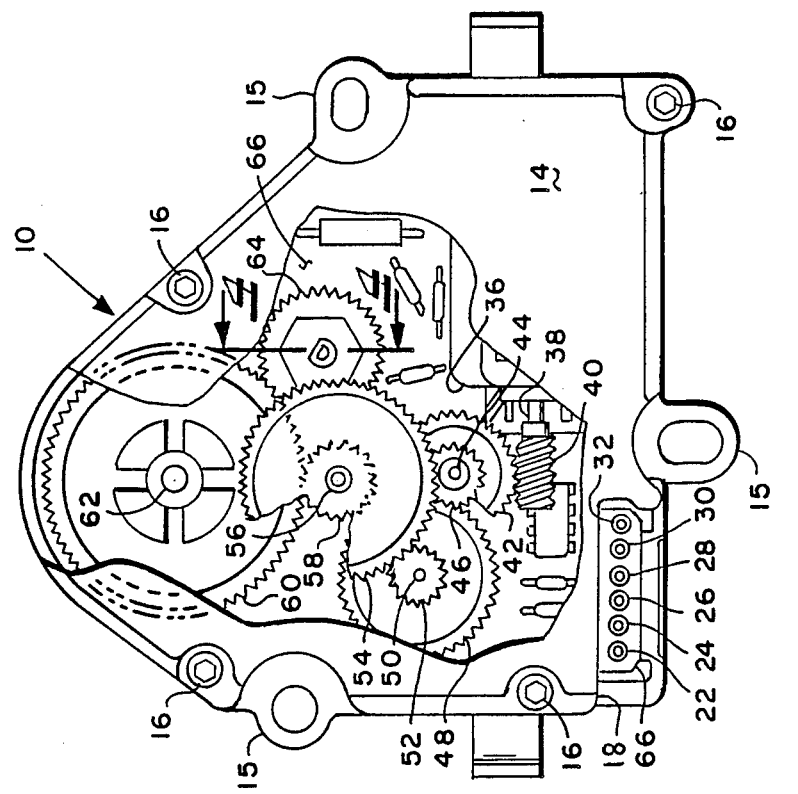
FIG. 1 is a plan view of the servoactuator of the present invention with portions of the housing cover broken away to expose the gear train.
Figure 2:
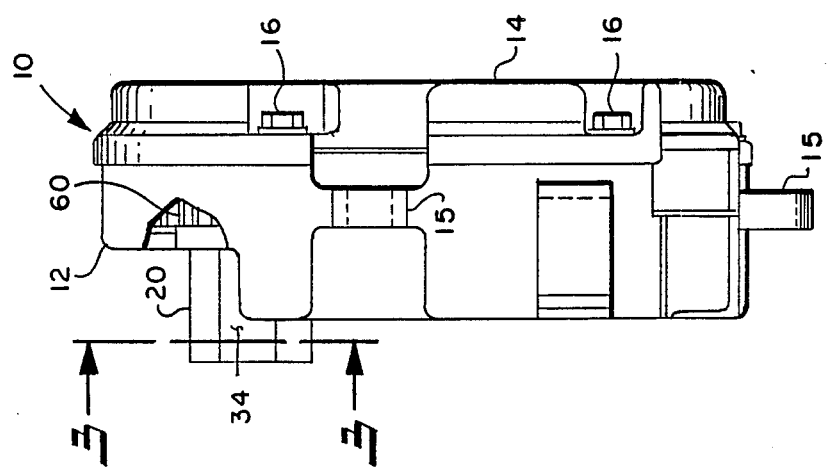
FIG. 2 is a left end view of the embodiment of FIG. 1.

Referring to FIGS. 1 and 2, the servoactuator of the present invention is indicated generally at 10 as having a housing comprising a lower case portion 12 having a generally hollow cupped-shape and a cover 14 secured to the lower case by suitable fasteners such as screws 16. Portions of the cover 14 have been broken away in FIG. 1 to expose the inner workings of the servoactuator. The cover 14 has a suitable cut-out 18 provided therein for exposing the electrical connectors pins 20, 22, 24, 26, 28, 30 and 32, which are adapted for electrical connection as will hereinafter be described. With reference to FIG. 2, the servoactuator has an output shaft 34 extending from the lower case portion and adapted for rotary driving connection thereto by virtue of oppositely disposed spaced flats, one of which is indicated by reference numeral 34 in FIG. 2.

Referring to FIG. 1, the lower case portion 12 has received therein a sub-fractional horsepower direct current motor 36 which has an output shaft 38 having a worm gear 48 attached thereto. The worm gear 40 engages a helical gear 42 which is journalled on an axle pin 44 having one end secured to the lower case portion 12 and the other end secured in a suitable boss (not shown) provided in the underside of cover 14. Helical gear 42 has a pinion gear formed integrally therewith on the hub thereof as shown partially at 46 by the broken away portion of the gear 42. Pinion 46 engages a second stage spur gear 48 which is journalled on an axle pin 50 which has one end received in a boss provided in the lower case portion 12 and the other end of the pin received in a corresponding boss (not shown) provided in the underside of cover 14.

Second stage spur gear 48 has formed integrally on the hub thereof a second stage pinion gear 52 which engages a third stage spur gear 54, which is journalled about pin 56 anchored at one end in lower case portion 12 and at the other end in a suitable boss (not shown) provided in the underside of cover 14. Third stage spur gear 54 has formed integrally therewith on the hub thereof a third stage pinion gear 58 which engages a fourth stage spur or output gear 60. The output gear 60 is formed integrally with the output shaft 20 (see FIG. 2) which in the presently preferred practice has has a shoulder 59 provided on the periphery thereof journalled in an aperture 61 in the lower case portion 12 of the housing and on an axle pin 62 pressed therein and which is journalled in a suitable boss (not shown) provided in the underside of cover 14.

Output gear 60 also engages a toothed ring gear 64 which is part of an electrical feedback means in the form of a potentiometer assembly as will hereinafter be described.

A printed circuit board 66 is received in the housing lower case portion 12 and has the electrical terminals 22–32 attached thereto as shown in FIG. 1 and has a portion thereof cut out to permit motor 36 to recess therein.

Referring to FIGS, 4 and 5, the potentiometer assembly indicated generally at 68 is shown wherein the potentiometer 70 preferably has a resistance of 10K ohms and has a rotatable control shaft 72 extending therefrom, which shaft has a keyway 74 provided therein. Shaft 72 has received thereover in a clearance fit relationship ring gear 64 which has a precisely controlled diameter counterbore 76 provided therein. In the assembled and calibrated condition shown in solid outline in FIG. 4, counterbore 76 is press fitted in interference engagement with the outside diameter of a retaining member in the form of collar 78 which is keyed to shaft 72 by a key 80 received in the keyway 74 for transmitting torque therebetween.

Calibration of the potentiometer is performed by positioning output gear 60 such that the flats on output shaft 20 have the desired rotational position with respect to the housing 12 for engagement with the device to be operated by servo 10, and positioning the shaft 72 of the potentiometer to a rotational position such that the desired percentage of full scale resistance of the potentiometer is detected electrically. With the output shaft of gear 60 so positioned and with potentiometer 70 providing the desired output resistance, collar 78 is moved axially from the dashed line position shown in FIG. 4 to the solid outline position shown in FIG. 4 wherein the collar 78 engages the counterbore 76 of the ring gear 64 in interference press fitted engagement to thereby rotationally position the shaft 72 with respect to the ring gear 64 and thereafter prevent relative rotation therebetween.

In the presently preferred practice, the gears in the speed reducer gear train have a ratio overall of 1500:1 and are formed of plastic material. Worm gear 40 is preferably formed of polyimide material having a minor fraction of fluorinated polymer or a minor fraction of fluoro-chlorinated polymer containing a lesser minor fraction of lubricant. In the presently preferred practice the worm gear is formed of nylon material having about 18% polytetrafluoroethylene (PTFE) and about 2% silicone lubricant.

In the presently preferred practice the helical spur gears and their integrally formed pinions are formed of acetal resin having about 18% polytetrafluoroethylene and about 2% silicone oil lubricant. It will be understood that PTFE has been found satisfactory in the presently preferred practice. Other suitable fluorinated polymers for floro-chlorinated polymers may be employed in place of the PTFE.

Referring to FIG. 6, the electrical schematic for the servoactuator of the present invention is indicated generally at 84. Upon user or vehicle operator selection of the closed position of the line power switch 86 and positioning of a temperature selector indentified as Operation Select in FIG. 6, potentiometer 88 provides power to the circuit at input pin 32 and receives a control signal input at pin 28 thereof through resistor R1 to junction 90. Junction 90 is connected to one negative input terminal of a first-half of a dual comparator U1 at pin 8 thereof and is also connected through resistor R2 to the wiper arm of potentiometer 70 which is a variable resistor R10. The variable resistor R10 is powered through diode CR2 and resistor R8 by battery voltage through pin 32 and is regulated by zener diode CR1.

Variable resistor R10 receives supply voltage B+ through junction 94; and, R10 is connected to the ground pin 26 through intermediate junctions 96, 98. The B+ supply voltage through junction 94 is also applied through resistor R9 to junction 100 and through junction 102 to a second-half negative input at pin 5 of dual comparator U1. The positive input at pin 6 of the second-half of the comparator U1 is connected through junction 104 to the negative input of pin 8 of the output of the first-half of comparator U1. The output of the first-half of U1 at pin 1 is applied through junction 106 and through resistor R7 to the negative terminal of motor 36. The positive terminal of motor 36 is connected through junction 108 to output pin 3 of the second-half of comparator U1. Feedback resistor R6 is connected between junctions 106 and 104 and feedback resistor R4 is connected between junction 102 and 108. The values of resistances, capacitances and diode designations are given in Table I below:

| R | Ohms | C | Micro-Farads | Diodes | Type |
|---|---|---|---|---|---|
| 1 | 100K, 1% | 1 | 93.1K, R 1 | Zener, 27v | |
| 2 | 93.1 1% | | | CR 2 | 16v |
| 3 | 100K, 1% | | | | |
| 4 | 3 Meg. | | | | |
| 5 | 499K, 1% | | | | |
| 6 | 3 Meg. | | | | |
| 7 | 4.99, 1% ¼w | | | | |
| 8 | 30, 2 W | | | | |
| 9 | 100K, | | | | |
| 10 | 10K, Ver. | | | | |

In operation, when the voltage at junction 90 from input resistor 88 and resistor R10 and pin 8 of device U1 is less than the voltage at pin 7, the motor rotates in one direction and when the voltage at junction 90 and pin 8 is greater than the voltage at pin 7 of device U1, the motor is driven in the opposite direction. The motor will rotate until the voltage at junction 90 equals the voltage from junction 102 as applied to pins 5 and 7 of U1, whereupon the comparator will null the motor.

The present invention thus provides a servoactuator providing a numerically high ratio of speed reduction from a sub-fractional horse power direct current low voltage electric motor to a geared output shaft and employs a gear train formed of plastic gears. The motor shaft gear is a worm gear formed of polyimide material having a minor fraction of fluorinated polymer and lesser fraction of silicone lubricating oil provided therein. The remaining helical and spur gears in the drivetrain are formed of acetal plastic material having a minor fraction of fluorinated or fluoro-chlorinated polymer with a lesser minor fraction of silicone oil lubricant provided therein.

The output position feedback potentiometer of the present servoactuator has a drive ring gear engaging the output gear and received over the potentiometer shaft initially in a loosely fitting arrangement. An annular collar is keyed to the shaft for driving connection therewith, but is axially movable along the key. Upon assembly of the servoactuator calibration is accomplished simply and inexpensively by rotating the output gear to a desired position and rotating separately the potentiometer shaft within the ring gear until the potentiometer gives an electrical signal corresponding to the desired percentage of its full scale electrical resistance for the selected output gear position. The annular collar is then moved axially on the key for engagement in a press or interference fit with the ring gear to lock the ring gear to the collar for thereafter providing driving engagement between the ring gear and the potentiometer shaft. The servoactuator of the present invention thus provides a means for calibrating the servoactuator after assembly of the gear train without the necessity of removal or disengagement of any of the gears.

In another aspect of the invention, the construction of the gear train employs a unique combination of materials therefor which provides improved silencing of the vibration and noise of the running gears.

Although the present invention has hereinabove been described with respect to the illustrated embodiments, it will be understood that modifications and variations may be made in the invention which is limited only by the scope of the following claims.

I claim:

1. A servoactuator comprising:
   (a) housing means;
   (b) motor means mounted on said housing means and operable upon electrical energization to provide rotation of a motor shaft;
   (c) speed reducing means driven by said motor shaft and having an output gear means adapted for connection to a device to be driven;
   (d) feedback means having a rotatable input shaft means having a rotatable input shaft means, said feedback means adapted for connection to a source of electrical potential and operative thereupon to provide an electrical signal indicative of the rotational position of said input shaft means, said feedback means including driven gear means engaging said speed reducing output gear means;
   (e) a retaining member movable axially with respect to said input shaft means between a first position permitting relative rotation between said driven gear means and said retaining member and a second position preventing relative rotation therebetween; and,
   (f) means operable to transmit torque between said retaining member and said input shaft means.

2. The servoactuator defined in claim 1, wherein,
   (a) said feedback means comprises a potentiometer with a rotatable shaft; and,
   (b) said input means first member comprises an annular member keyed to said rotatable shaft and said second member comprises a ring gear means fitted onto said retaining member when said member is in said second position.

3. The servoactuator defined in claim 1, wherein said motor shaft includes a a worm gear and said speed reducer means includes a gear driven by said worm gear.

4. The servoactuator defined in claim 1, wherein said motor shaft includes a worm gear formed of plastic selected from the group consisting of material having the composition thereof essentially of:
   (a) polymide and a minor fraction of fluorinated polymer;
   (b) polymide and a minor fraction of fluorochlorinated polymer;
   (c) polymide and a minor fraction of lubricant; and, said speed reducer includes a plastic driven gear engaging said worm gear.

5. The servoactuator defined in claim 1, wherein said motor shaft includes a worm gear formed of plastic material and said speed reducer includes a plastic driven gear engaging said worm gear and formed of material selected from the group consisting essentially of:
   (a) a minor fraction of fluorinated polymer balance acetal resin,
   (b) a minor fraction of lubricant balance acetal resin, or
   (c) a minor fraction of fluorinated polymer with a lesser fraction of lubricant, balance acetal resin.

6. The servoactuator defined in claim 1, wherein said motor shaft includes a worm gear formed of plastic material consisting of a minor fraction by weight of fluorinated polymer and a lesser fraction by weight of silicone oil balance polymide and said speed reducer includes a plastic drive gear engaging said worm gear.

7. The servoactuator defined in claim 1, wherein said motor shaft includes a plastic worm gear and said speed reducer includes a driven gear formed of plastic material consisting essentially of a minor fraction by weight of fluorinated polymer and a lesser fraction of silicone oil, balance acetal resin.

8. The servoactuator defined in claim 1, wherein said motor shaft includes a plastic worm gear formed of material consisting essentially of about 18% by weight fluorinated polymer, about 2% by weight silicone oil balance polymide and said speed reducer includes a plastic gear engaging said worm gear.

9. The servoactuator defined in claim 1, wherein said motor shaft includes a plastic worm gear and said speed reducer includes a plastic driven gear formed of material consisting essentially of 18% by weight fluorinated polymer and about 2% by weight silicone oil, balance acetal resin.

10. An electrically powered servoactuator of the type having a motor driven speed reducer means with an output gear means and a feedback potentiometer sensing the output gear means position characterized in that:
   (a) said potentiometer has an input shaft with an input gear means, said input gear means coupled to said output gear means for rotation thereby;
   (b) a retaining member in rotational driving engagement with said potentiometer input shaft, said retaining member axially movable with respect thereto between a first and second position and operable in said first position to permit rotation of said input gear means with respect to said input shaft and in said second position operative for coupling said retaining member to said input gear for effecting rotation of said potentiometer shaft by said input gear, wherein said retaining member is moved from said first to said second position upon calibration of said potentiometer.

11. The servoactuator defined in claim 10, wherein said potentiometer input member is keyed to said potentiometer shaft and said input gear is press-fitted into driving engagement with said retaining member in said second position.

12. The servoactuator defined in claim 10, wherein said retaining member is releasably engaged to said potentiometer shaft.

13. A servoactuator of the type having an electrically powered motor driven speed reducer means with an output member and a feedback sensor sensing the output member position characterized in that:

said speed reducer means has a motor worm gear formed of material having a minor fraction of fluorinated polymer, a lesser fraction of lubricant balance plastic, and at least one gear driven by said worm gear, said driven gear formed of material having a minor fraction of fluorinated polymer, a lesser fraction of lubricant, balance plastice; and, said feedback sensor includes input shaft means, driven gear means engaging said output shaft and a retaining member movable between a first position and a second position and operable in said first position to permit independent rotational positioning of said input shaft means with respect to said gear means for calibration and operable in said second position to enable said gear means to drive said input shaft means.

14. The servoactuator defined in claim 13, wherein said balance plastic for said worm gear consists essentially of polyimide material.

15. The servoactuator defined in claim 13, wherein said balance plastic for said drive gear consists essentially of acetal material.

16. The servoactuator defined in claim 13, wherein said worm gear minor fraction of fluorinated polymer consists essentially of about eighteen percent (18%) by weight of polytetrafluoroethylene material.

17. The servoactuator defined in claim 13, wherein said worm gear lesser fraction of lubricant consists essentially of about two percent (2%) silicone oil.

18. The servoactuator defined in claim 13, wherein said driver gear minor fraction of fluorinated polymer consists essentially of about eighteen percent (18%) by weight of polytetrafluroethylene.

19. The servoactuator defined in claim 13, wherein said driver gear lesser minor fraction of lubricant consists essentially of about two percent (2%) silicone oil.

20. A servoactuator of the type having a motor driven speed reducer means with an output gear means and a feedback sensor sensing the output gear means position characterized in that:

said feedback sensor includes input shaft means, driven gear means engaging said output shaft means and a retaining member movable between a first and second position, said retaining member operable in said first position to permit independent positioning of said output gear means with respect to said input shaft means sensor for calibration, said retaining member lockable means operable in said second position to effect driving engagement between said driven gear means and said input shaft means.

* * * * *